United States Patent Office 3,384,653
Patented May 21, 1968

---

3,384,653
COMPOSITIONS OF METHYLENEBIS(PHENYL ISOCYANATE) WITH TRIHYDROCARBYL PHOSPHATES AND PREPARATION THEREOF
William E. Erner, Hamden, and Alec Odinak, New Haven, Conn., assignors to The Upjohn Company, Kalamazoo, Mich., a corporation of Delaware
No Drawing. Filed Mar. 31, 1965, Ser. No. 444,391
12 Claims. (Cl. 260—453)

ABSTRACT OF THE DISCLOSURE

Methylenebis(phenyl isocyanate), a solid of melting point, circa 40° C., is transformed to a storage stable liquid by heating at 160° C. to 250° C. with 0.1% to 3% by weight of a trihydrocarbyl phosphate (trialkyl phosphate, e.g., triethyl phosphate, is preferred). The liquid isocyanate so obtained can be used for all polyurethane syntheses for which the untreated methylenebis(phenyl isocyanate) is commonly employed.

---

This invention relates to novel isocyanate containing compositions and to processes for their preparation and is more particularly concerned with novel, storage stable, compositions derived from methylenebis(phenyl isocyanate), with processes for their preparation, and with polyurethanes derived therefrom.

One of the diisocyanates commonly used in the preparation of both cellular and noncellular polyurethanes is methylenebis(phenyl isocyanate). This material is available commercially either in substantially pure form or in admixture with related polyisocyanates having higher functionality. The latter mixtures are generally produced by phosgenation of a mixture of polyamines produced by acid condensation of formaldehyde and aniline; see, for example, U.S. Patents 2,683,730, 2,950,263, and 3,012,008. Such mixed products containing methylenebis(phenyl isocyanate) are normally liquids at temperatures of 20° C. or higher. They therefore present no difficulties in handling or dispensing through conventional foam and elastomer formulation mixing machines.

Substantially pure methylenebis(phenyl isocyanate), on the other hand, presents a problem in that it is normally a solid at room temperature (circa 25° C.) having a melting point of the order of 35 to 42° C. This material has, therefore, to be melted and maintained in a molten state in order that it can be transferred by piping and pumping arrangements normally employed in the preparation of polyurethanes.

By substantially pure methylenebis(phenyl isocyanate), as the term is employed throughout this specification and claims, is meant methylenebis(phenyl isocyanate) substantially free from, i.e., containing less than about 5% by weight of, polyisocyanates of higher functionality which are normally produced in the preparation of the crude material. The purified form of methylenebis(phenyl isocyanate) is generally prepared by distillation of a crude mixture containing the product obtained by phosgenation of the corresponding mixed polyamine as discussed above. The product so obtained normally contains approximately 90% of 4,4'-methylenebis(phenyl isocyanate) and about 10% of the corresponding 2,4'-isomer and has a melting point of the order of about 37 to 41° C. It is to be understood however that the process and compositions of the invention are not limited to the use of a product having this particular proportion of isomers but can be applied to any methylenebis(phenyl isocyanate) product, including the individual pure 4,4'- and 2,4'-isomers, which is substantially free from polyisocyanates of higher functionality.

It is an object of the invention to convert a methylenebis(phenyl isocyanate) which is normally solid at room temperature, (i.e., approximately 25° C.) to a storage stable liquid product which is suitable for transfer as a liquid using conventional procedures and apparatus for the preparation of polyurethanes. It is a further object of the invention to provide a liquid isocyanate composition which can be used in the preparation of all types of polyurethanes for which unmodified methylenebis(phenyl isocyanate) is currently employed.

These and other objects of the invention are accomplished by means of the process of the invention. The latter, in its broadest aspect, represents a process for producing an isocyanate composition which is a stable liquid at temperatures above about 15° C., which process comprises heating a methylenebis(phenyl isocyanate), which is normally solid at about 15° C., with from about 0.1 to about 3% by weight of a trihydrocarbyl phosphate at a temperature within the range of about 160° C. to about 250° C.

The term "hydrocarbyl" as it is employed throughout the specification and claims means the monovalent radical obtained by removing one hydrogen atom from the parent hydrocarbon, preferably from a parent hydrocarbon containing from 1 to 12 carbons atoms, inclusive. Illustrative of such hydrocarbyl groups are: alkyl such as methyl, ethyl, propyl, butyl, pentyl, hexyl, octyl, decyl, dodecyl, and the like, including isomeric forms thereof; alkenyl such as allyl, butenyl, pentenyl, hexenyl, octenyl, dodecenyl, and the like, including isomeric forms thereof; aralkyl such as benzyl, phenethyl, phenylpropyl, benzhydryl, naphthylmethyl, and the like; aryl such as phenyl, tolyl, xylyl, naphthyl, biphenylyl, and the like; cycloalkyl such as cyclobutyl, cyclopentyl, cylohexyl, cycloheptyl, cyclooctyl and the like, including isomeric forms thereof; and cycloalkenyl such as cyclopentenyl, cyclohexenyl, cycloheptenyl, and the like, including isomeric forms thereof.

The preferred trihydrocarbyl phosphates employed in the process of the invention are the trialkylphosphates wherein alkyl contains from 1 to 12 carbon atoms, inclusive, such as methyl, ethyl, propyl, butyl, pentyl, hexyl, heptyl, octyl, nonyl, decyl, undecyl, dodecyl, and isomeric forms thereof.

The discovery that the above process can be employed to produce the storage stable liquid compositions of the invention is both surprising and unexpected. Thus, it has been suggested previously that heating diisocyanates with a trihydrocarbyl phosphate produces the corresponding polycarbodiimides; see, for example, U.S. Patent 3,056,835. It has also been suggested (see, Example 3 of U.S. Patent 3,152,162) that heating methylenebis (phenyl isocyanate) alone, in the absence of any catalyst, produces a product which crystallizes upon standing at room temperature. Accordingly it is all the more surprising to find that heating methylenebis(phenyl isocyanate) under the conditions described above produces a storage stable liquid product.

Methylenebis(phenyl isocyanate) which is currently available commercially is, as discussed above, generally obtained by distillation of a crude mixture of isocyanates obtained by phosgenating a mixture of polyamines, which polyamine mixture has been obtained by acid condensation of aniline and formaldehyde. The methylenebis(phenyl isocyanate) so obtained tends to dimerize on standing for prolonged periods and in many cases such products, after storage, contain from about 2% to 5% dimer. When the methylenebis(phenyl isocyanate) containing dimers is melted prior to use the dimers remain as a suspension. It has been found that such dimer-containing products can be subjected, without any prior treatment, to the process of the invention to give products which are homogeneous liquids and which have no significant dimer content, i.e., the dimer is reconverted to monomer by the process of the invention. Further, the products so obtained by the process of the invention show no tendency towards dimer formation on prolonged standing. The above represents a further unexpected advantage in the process of the invention.

The process of the invention can be carried out by bringing together in any convenient manner the methylenebis(phenyl isocyanate) and the trihydrocarbyl phosphate in the proportions and within the temperature range set forth above. The process can be carried out using a batch procedure or, in a particular aspect of the invention to be described hereinafter, using a continuous process. The requisite time for which the mixture of isocyanate and trihydrocarbyl phosphate is heated is a function of both the amount of trihydrocarbyl phosphate employed and the reaction temperature. Generally speaking, the heating time required varies from about one quarter of an hour to about 4 hours, although shorter and longer times of heating can be employed depending on the particular trihydrocarbyl phosphate and reaction conditions used.

The required heating time for any particular combination of concentration of trihydrocarbyl phosphate and reaction temperature can be determined readily by heating aliquots of the mixture of isocyanate and trihydrocarbyl phosphate at the desired heating temperature for different lengths of time and observing the storage stability characteristics of the products so produced.

In general, the heating time required for any particular combination of catalyst concentration and reaction temperature is that necessary to change the isocyanate equivalent of the reaction mixture from the starting value of approximately 125 to a value within the range of about 130 to about 150. Preferably the heating is continued until the isocyanate equivalent of the reaction mixture has reached a value of about 130 to about 140.

The method employed to determine the isocyanate equivalent to which reference is made throughout the specification and claims is that described in ASTM D1638–60T with the modification that the test sample is heated to reflux in dry toluene in the presence of the dibutylamine and the mixture is then held at reflux for 45 minutes before cooling and continuing the specified procedure.

When the heating period in the process of the invention has been completed, as determined by one or more of the criteria set forth above, the reaction mixture is cooled or is allowed to cool room temperature, i.e., of the order of about 25° C. In certain cases, a small amount of solid may separate during the first 24 hours of standing at room temperature. In such instances, it is merely necessary to remove the solid which has separated by filtration, decantation, centrifugation or like procedures. It is found that the clarified liquid is stable on storage indefinitely at ambient room temperature. The formation of this minor proportion of solid material in the early stages of storage is observed only rarely. It occurs only when operating on a batch basis and is not normally encountered when the process is run on a continuous basis as will be described hereinafter.

When carrying out the process of the invention on a continuous basis, a mixture of the methylenebis(phenyl isocyanate) starting material and the trihydrocarbyl phosphate is passed through a heating zone in which the mixture is heated at the desired temperature. The rate of flow of mixture through the heating zone is adjusted so that the period of residence in the heating zone falls within the required range as determined using the procedures and criteria described above. A wide variety of conventional apparatus can be employed for this purpose. Particularly useful is apparatus of the type in which the mixture to be heated is spread in the form of a thin film over the walls of the heating vessel. Using apparatus of this type the rate of heat transfer is of a higher order and the residence time in the heating zone can be correspondingly reduced. A typical example of such apparatus is that set forth in U.S. Patent 2,927,634.

Another type of apparatus which can be employed to carry out the process of the invention is that in which the mixture to be heated, in this case the mixture of methylenebis(phenyl isocyante) and trihydrocarbyl phosphate, is passed under gravity into a heated, turbulent mixing zone from which it passes to a quiet zone and finally to a dead zone. The treated material is recovered from the dead zone at a rate equal to the rate of introduction of feed to the mixing zone, said rate being chosen so as to provide a suitable residence time in the reactor necessary to carry out the process of the invention.

A typical example of the above type of apparatus is composed of a cylindrical vessel mounted with its axis substantially vertical. The upper portion of said vessel is provided with heating means such as steam coils and the like and stirrer means capable of producing a turbulent zone. Said upper portion of the vessel is separated from the lower portion of said vessel by a zone which offers restricted passage to the flow of liquid and which serves as the "quiet zone" referred to above. The latter zone is generally packed with inert granular material, sintered glass, wire gauze, and the like materials offering resistance to free flow of liquid, said materials being supported between two baffle plates. The portion of the vessel below this quiet zone is the so-called "dead zone" in which the material passing under gravity from the quiet zone collects. Exit means are provided for removing from the vessel the material which collects in the quiet zone. In a convenient form of apparatus the exit means comprises an open tube, the lower end of which is connected to a lower point in the quiet zone and the upper and open end of which is arranged to discharge fluid at a point outside the reaction vessel but in the same horizontal plane as the intended upper level of reaction mixture in the vessel. Using this system the rate of discharge of reaction product from the vessel is automatically determined by the rate at which reaction mixture is fed into the vessel and this in turn governs the average residence time of reaction mixture in the vessel.

It is to be understood that the above types of reaction vessel are given as examples only and that, as will be obvious to one skilled in the art, other types of reaction vessel can be used in carrying out the process of the invention. The invention is not limited to the use of any particular type of reaction vessel but can be carried out in a variety of ways provided the various limitations as to the reaction time and temperature set forth above are observed.

The same considerations as to reaction time, reaction temperature, and concentration of trihydrocarbyl phosphate apply when carrying out the process of the invention on a continuous basis and on a batch basis. In general, it is found that the reaction time necessary for any combination of reaction temperature and concentration of trihydrocarbyl phosphate is lower when operating on a continuous basis but said reaction time is still within the limits set forth above. The most appropriate reaction time in any instance can be determined using the criteria set forth above.

The storage stable liquid isocyanate compositions obtained according to the invention can be used for all purposes for which the original unmodified methylenebis (phenyl isocyanate) can be used. Thus the isocyanate compositions of the invention can be used in the preparation of a variety of polyurethanes, both cellular and noncellular, which are presently prepared using unmodified methylenebis(phenyl isocyanate). Such polyurethanes include flexible, semi-rigid, and rigid foams, elastomers including fibres and filaments, sealants, supported and unsupported films, and the like.

Methods for preparing these various compositions are well known in the art; see, for example, Saunders et al., Polyurethanes, Chemistry and Technology, part II, Interscience Publishers, New York (1962). In general the physical properties of the polyurethane compositions prepared from the isocyanate compositions are at least as good as the properties of the corresponding compositions obtained using unmodified methylenebis(phenylisocyanate).

The following examples describe the manner and process of making and using the invention and set forth the best mode contemplated by the inventors of carrying out the invention but are not to be construed as limiting.

EXAMPLE 1

A mixture of 340 g. of methylenebis(phenyl isocyanate) [M.P. 37 to 41° C.; found by vapor chromatography to contain 90% by weight of 4,4′-methylenebis (phenyl isocyanate) and 10% by weight of the corresponding 2,4′-isomer; obtained by distillation of a mixture of polyisocyanates containing approximately 50% of methylenebis(phenyl isocyanate) produced by phosgenation of a mixture of polyamides which latter was obtained by condensation of aniline and formaldehyde in the presence of hydrochloric acid] and 5 g. of triethyl phosphate was heated at 200° C. with stirring for about 25 minutes. At the end of this time the reaction product was cooled to room temperature (circa 25° C.) and allowed to stand at this temperature for 48 hours. A small amount of white powdery solid separated and was removed by filtration. The filtrate was a clear liquid which showed no signs of solidification after standing at approximately 25° C. for 8 weeks.

EXAMPLE 2

A mixture of 2812 g. of methylenebis(phenyl isocyanate [M.P. 37–41° C.; isocyanate equivalent 124.6; prepared as described for the starting material of Example 1] was melted by heating to about 60° C. and 29 g. (1.03% by weight) of triethyl phosphate was added with stirring. The resulting mixture was heated with stirring at 200 to 210° C. for 4 hours and was then cooled to room temperature (approximately 25° C.). After the product so obtained had been standing for 48 hours a minor amount of solid material which had separated was removed by filtration. The filtrate was a clear yellow liquid having an isocyanate equivalent of 140.9. This product showed no signs of solidification after standing at approximately 25° C. for 8 weeks.

Using the above procedure but replacing triethylphosphate by tripropylphosphate, trihexylphosphate, triisobutylphosphate, triphenylphosphate, and tribenzylphosphate, there are obtained isocyanate compositions which remain liquid on storage at about 25° C. for prolonged periods.

EXAMPLE 3

The apparatus employed in the processes described in this example comprised an 18-inch length of 4-inch I.D. glass pipe with the axis aligned vertically and designed as a fully baffled stirred reactor. The lower 3″ of the pipe formed a dead zone above which was a 2-inch thick wire mesh screen having 90% void space defining a quiet zone. The remaining upper part of the cylinder was provided with a paddle stirrer having blades set just above the top of the quiet zone, a heating coil and an inlet tube.

An exit tube was positioned so that its lower end led from the bottom of the dead zone and its upper, open end was positioned alongside the upper part of the tube reactor at a point 10 inches above the top of the quiet zone.

To this reactor was charged 2,325 ml. of a liquid isocyanate product prepared as described in Example 2 by heating methylenebis(phenyl isocyanate) with 1% triethylphosphate at 200 to 210° C. for 4 hours. This initial charge was stirred and heated until the temperature reached 191° C. at which point a mixture of methylenebis(phenyl isocyanate) [isocyanate equivalent 126.6; containing 6.9% 2,4′-isomer and 93.1% 4,4′-isomer; prepared as described for starting material of Example 1] and 1% (by weight of isocyanate) of triethyl phosphate was charged to the reactor at an initial rate of 55.5 ml./min. Effluent was collected from the exit tube at the same rate. The feed rate and the temperature of the reaction mixture were slowly increased as indicated in the following table which also indicates fractions of effluent collected. A volume of effluent corresponding to the original charge present in the reaction vessel had been eliminated from the vessel at the end of 75 minutes reaction time.

| Time (from start of feed) | Temperature (° C.) of reaction mixture | Feed rate (ml./min.) | 2217 Fraction of effluent |
|---|---|---|---|
| 0 | 191 | 55.5 | Original charge |
| 30 | 220 | 75 | |
| 55 | 246 | 96 | |
| 75 | 250 | 96 | |
| 80 | 250 | 111 | 1 |
| 90 | 244 | 111 | |
| 104 | 243 | 111 | |
| 110 | 243 | 111 | 2 |
| 120 | 246 | 111 | |
| 123 | 246 | 111 | |
| 125 | 246 | 111 | 3 |
| 135 | 250 | 111 | |
| 140 | 253 | 165 | |
| 142 | 252 | 165 | 4 |
| 146 | 248 | 165 | |
| 155 | 240 | 165 | |
| 156 | 240 | 165 | 5 |
| 160 | 237 | 165 | |
| 168 | 234 | 165 | |
| 174 | 233 | 165 | 6 |
| 185 | 230 | 165 | |
| 189 | 232 | 165 | |
| 192 | 240 | 0 | 7 |
| 195 | 253 | 0 | |
| 197 | 255 | 0 | |

The following table summarizes the average reactor residence time (calculated from feed rates on the basis of simple plug flow) and range of reaction temperature for each of the above fractions, and the isocyanate equivalent of each fraction.

| Fraction No. | Average reactor Residence Time (Minutes) | Reaction Temperature, ° C. | I.E. |
|---|---|---|---|
| 1 | 60 | 230–250 | 146.4 |
| 2 | 45 | 240–250 | ---- |
| 3 | 45 | 240–250 | 146 |
| 4 | 30 | 240–250 | ---- |
| 5 | 30 | 240–250 | 146.5 |
| 6 | 15 | 230–250 | 139.5 |
| 7 | 15 | 230–245 | 141.2 |

Each of the above fractions was maintained at approximately 25° C. and no sign of solidification or separation of solid was observed after a period of 13 weeks.

EXAMPLE 4

A total of 3355 g. of methylenebis(phenyl isocyanate) [isocyanate equivalent 126.6; containing 6.9% 2,4′-isomer and 93.1% 4,4′-isomer; prepared as described for starting material of Example 1] was melted at 60 to 70° C.

(A) A 1500 g. portion of the molten material was mixed with 15 g. of triethyl phosphate and the mixture was heated with stirring at 205 to 214° C. for 3 hours before being cooled to 25° C. using a cooling bath. The clear yellow liquid so obtained had an isocyanate equivalent of 142.1 (mean of duplicates) and showed no signs of solidification after standing at about 25° C. for 8 weeks.

(B) The remainder of the molten methylenebis(phenyl isocyanate) obtained as described above was filtered at about 60 to 70° C. and 1500 g. of the molten filtrate was mixed with 15 g. of triethyl phosphate. The mixture so obtained was heated with stirring at 205 to 215° C. (minimum and maximum of range) for 3 hours before being cooled to 25° C. using a cooling bath. The clear yellow liquid so obtained had an isocyanate equivalent of 141.0 (mean of duplicates) and showed no signs of solidification after standing at about 25° C. for 8 weeks.

A blend of equal parts of each of the above two batches was prepared and employed in the production of a foam as described in Example 5.

EXAMPLE 5

A flexible polyurethane foam was prepared as follows:

A mixture of 100 g. of TE-3000 (a polyether polyol based on glycerol; m.w. 3,000; Jefferson Chemical Company), 0.3 g. of stannous octoate, 0.5 g. of N,N,N',N'-tetramethyl-1,3-butanediamine, 0.5 g. of DC-202 (organosilicone surfactant; Dow Corning), 0.1 g. of Acryloid 710 (a 35% solids solution of copolymerized methacrylates in 100 centistokes neutral oil measured, @100° F.; cell opener: Rohm and Haas) was prepared using a mechanical blender. To this mixture was added with high speed stirring 70 g. of the liquid isocyanate composition prepared as described in Example 4. The resulting mixture was poured rapidly into an open mould (measuring 7″ x 7″ x 12″ high) and allowed to foam. The resulting foam was aged at about 25° C. for 24 hours at which time it tested according to the procedure of ASTM D1564-59T and was found to have the following properties:

| | |
|---|---|
| Density, lb./cu. ft. | 1.70 |
| Compression set @158° F., 90% (Method B) | 10.3 |
| Tear resistance, p.s.i. | 0.3 |
| Tensile strength, p.s.i. | 21.9 |
| Elongation, percent | 200 |
| Resiliency, percent (ball rebound) | 27 |

We claim:

1. An isocyanate composition which is a storage stable liquid at temperatures above about 15° C., which composition comprises the product obtained by heating a methylenebis(phenyl isocyanate) which is normally solid at about 15° C. with from about 0.1% to about 3% by weight of a trihydrocarbyl phosphate wherein hydrocarbyl is from 1 to 12 carbon atoms, inclusive, at a temperature within the range of about 160° C. to about 250° C.

2. An isocyanate composition which is a storage stable liquid at temperatures above about 15° C. which composition comprises the product obtained by heating a methylenebis(phenyl isocyanate) which is normally solid at about 15° C. with from about 0.1% to about 3% by weight of a trialkyl phosphate wherein alkyl is from 1 to 12 carbon atoms, inclusive, at a temperature within the range of about 160° C. to about 250° C. until the isocyanate equivalent of the reaction mixture is within the range of about 130 to about 150.

3. An isocyanate composition which is a storage stable liquid at temperatures above about 15° C. which composition comprises the product obtained by heating a methylenebis(phenyl isocyanate) which is normally solid at about 15° C. with from about 0.1% to about 3% by weight of triethyl phosphate at a temperature within the range of about 160° C. to about 250° C. until the isocyanate equivalent of the reaction mixture is within the range of about 130 to about 150.

4. A process for producing an isocyanate composition which is a stable liquid at temperatures above about 15° C. which comprises heating a methylenebis(phenyl isocyanate), which is normally solid at about 15° C. with from about 0.1% to about 3% by weight of a trihydrocarbyl phosphate wherein hydrocarbyl is from 1 to 12 carbon atoms, inclusive at a temperature within the range of about 160° C. to about 250° C.

5. The process of claim 4 wherein the methylenebis(phenyl isocyanate) contains approximately 90% of 4,4'-methylenebis(phenyl isocyanate) and approximately 10% of 2,4'-methylenebis(phenyl isocyanate).

6. The process of claim 4 wherein the methylenebis(phenyl isocyanate) employed as starting material has been obtained by distillation of a mixture of polyisocyanates produced by phosgenation of a mixture of polyamines derived by condensation of aniline and formaldehyde in the presence of hydrochloric acid.

7. The process of claim 4 wherein the heating of the mixture of methylenebis(phenyl isocyanate) and trihydrocarbyl phosphate is continued at a temperature within the range of about 160° C. to about 250° C. until the isocyanate equivalent of the mixture is within the range of about 130 to about 150.

8. A process for producing an isocyanate composition which is a stable liquid at temperatures above about 15° C., which process comprises heating a methylenebis(phenyl isocyanate) which is normally solid at about 15° C. with from about 0.1% to about 3% by weight of a trialkyl phosphate wherein alkyl is from 1 to 12 carbon atoms, inclusive at a temperature within the range of about 160° C. to about 250° C.

9. The process of claim 8 wherein the trialkyl phosphate is triethyl phosphate.

10. A process which comprises passing a mixture of a methylenebis(phenyl isocyanate) which is normally solid at about 15° C. and from about 0.1% to about 3% by weight of a trihydrocarbyl phosphate wherein hydrocarbyl is from 1 to 12 carbon atoms, inclusive, through a heating zone maintained at a temperature within the range of about 160° C. to about 250° C., the rate of flow of the mixture through the heating zone being so adjusted that the isocyanate equivalent of the effluent is within the range of about 130 to about 150.

11. The process of claim 10 wherein the trihydrocarbyl phosphate is a trialkyl phosphate.

12. The process of claim 11 wherein the trialkyl phosphate is triethyl phosphate.

References Cited

UNITED STATES PATENTS

| 2,476,779 | 7/1949 | Sturgis | 260—453 |
| 2,957,903 | 10/1960 | Spiegler | 260—453 |

FLOYD D. HIGEL, *Primary Examiner.*